US011645071B1

(12) United States Patent
Liu et al.

(10) Patent No.: US 11,645,071 B1
(45) Date of Patent: May 9, 2023

(54) INTELLIGENT INSTALLATION FOR CLIENT SYSTEMS

(71) Applicant: INTERNATIONAL BUSINESS MACHINES CORPORATION, Armonk, NY (US)

(72) Inventors: Rui Liu, Beijing (CN); Peng Hui Jiang, Beijing (CN); Yue Chen, Beijing (CN); Ya Xiao, Beijing (CN); Hu Wang, Beijng (CN); Jun Su, Beijing (CN)

(73) Assignee: International Business Machines, Corporation, Armonk, NY (US)

( * ) Notice: Subject to any disclaimer, the term of this patent is extended or adjusted under 35 U.S.C. 154(b) by 0 days.

(21) Appl. No.: 17/659,677

(22) Filed: Apr. 19, 2022

(51) Int. Cl.
*G06F 9/44* (2018.01)
*G06F 8/77* (2018.01)
*G06F 11/30* (2006.01)
*G06F 11/34* (2006.01)

(52) U.S. Cl.
CPC ............ *G06F 8/77* (2013.01); *G06F 11/3006* (2013.01); *G06F 11/3409* (2013.01)

(58) Field of Classification Search
None
See application file for complete search history.

(56) References Cited

U.S. PATENT DOCUMENTS

| 7,496,913 | B2 | 2/2009 | Hayes, Jr. |
| 7,512,895 | B2 | 3/2009 | Snover |
| 8,881,131 | B2 | 11/2014 | Capomassi |
| 9,058,230 | B1 | 6/2015 | Van Rietschote |
| 10,223,138 | B2 * | 3/2019 | Chakra ..................... G06F 8/61 |
| 11,237,813 | B1 * | 2/2022 | Chen ........................ G06F 8/65 |
| 2006/0010345 | A1 | 1/2006 | Schnoebelen |
| 2008/0307413 | A1 | 12/2008 | Ferris |
| 2011/0239212 | A1 * | 9/2011 | Wookey ................. G06F 8/658 |
| | | | 717/178 |

(Continued)

OTHER PUBLICATIONS

Disclosed Anonymously, "Apparatus to Assist Users when Errors Occur During Software Installation", https://priorart.ip.com/IPCOM/000239266, IP.com IPCOM000239266D, Oct. 24, 2014, pp. 1-5.

(Continued)

*Primary Examiner* — Qamrun Nahar
(74) *Attorney, Agent, or Firm* — L. Jeffrey Kelly

(57) ABSTRACT

A method, a computer program product, and a computer system intelligently install a component to a client system. The method includes performing an association analysis to generate a component association model based on historical installation information for historically installed components on one or more further client systems. The component association model includes a build success rate model indicative of at least one of the one or more further client systems having a close relationship to the client system based on a metric pair analysis of corresponding parameters in the historical installation information and installation information of the client system. The method includes determining an installation path to install the component to the client system based on the component association model. The method includes transmitting assistance information to the client system based on the installation path.

20 Claims, 5 Drawing Sheets

(56) References Cited

U.S. PATENT DOCUMENTS

2021/0019135 A1* 1/2021 Hwang ................ G06F 8/65
2022/0164645 A1* 5/2022 Zaina ................. G06F 8/65

OTHER PUBLICATIONS

Mell et al., "The NIST Definition of Cloud Computing", National Institute of Standards and Technology, Special Publication 800-145, Sep. 2011, pp. 1-7.
Oracle, "Oracle Exadata Cloud@Customer Deployment Assistant", https://docs.oracle.com/en-us/iaas/exadata/doc/eccdeployment-assistant.html. Copyright 2021, Oracle and/or its affiliates, pp. 1-4.

* cited by examiner

INTELLIGENT INSTALLATION FOR CLIENT SYSTEMS

BACKGROUND

The exemplary embodiments relate generally to installations, and more particularly to intelligently installing components to a client system for cloud services based on similar client systems.

A client system may involve a variety of components being installed. For example, a client system may retain a product provider who provides different products for corresponding services to be utilized such as enterprise services, cloud services, etc. Each product may involve respective components that must be properly installed for the services to be correctly available. Each client system may install the components that may be directed to a wide range of installation parameters.

When the product provider tests a user experience of installing the new products or the corresponding components, the product provider cannot reasonably evaluate every permutation involving the different potential platforms and installation parameters such as the operating system, Kubernetes, IaaS, PaaS, etc. that may each have different versions. The product provider may also not be capable of identifying an impact of installing the new products or the individual components to the client system. The product provider may further not be capable of determining all exceptions such as network outages, timeout, fault inputs, etc. The issues surrounding installing the products or components become more severe in various cloud and/or micro-service environments due to the diverse vendors that may be involved.

A typical installation that is otherwise successful with certain client systems may still fail in a particular environment due to a particular cause. For example, different object storage services provided by different PaaS may fail due to specific parameters (e.g., firewall, special language style, etc.). The failure and error correction may cost a great amount of time and effort that may be duplicated in overall cost. The potential failure and how to avoid and/or fix the failure may not be shared in an effective way that leads to repetitious failures in other client systems.

It may not be possible to find the typical failures and solutions among the particular client system and respective environment unless there is a historical instance of a real installation where the installation parameters are identical to a current installation. However, even if such a historical instance existed, the product provider may be unaware or not have access thereto such that the current installation may be properly affected.

There have been conventional approaches that aid in installation of products. For example, U.S. Pat. No. 8,881,131 describes a conventional approach to populate a software catalogue by scanning file systems on a plurality of computers or by user input. The conventional approach inventories software products that populates the software catalogue without manual intervention of an administrator. However, this conventional approach merely creates the catalogue. In another example, U.S. Pat. No. 10,223,138 describes a conventional approach to monitor user behavior when installing software with already known successful paths provided by the software vendor. If there is a significant deviation detected from the user installation behaviors, the conventional approach guides the user for the best approach. In a further example, U.S. Publ. Appln. No. 2006/0010345 describes providing installation support for traditional computer systems by collecting information at pre-defined points and launching a diagnostic only after a failed installation attempt. In yet another example, U.S. Publ. Appln. No. 2011/0239212 describes how software vendors may provide a software dependency map at various levels and a way for a client to use multiple software dependency maps from different vendors to support automated software installation. In an additional example, U.S. Pat. No. 9,058,230 describes a generic installer executing on a remote node that identifies a set of installation instructions configured to install a software product on the remote node, execute the set of installation instructions, record results of the execution of the installation instructions, and if an error is detected, analyze the results to determine whether a solution to the error is available and execute the solution.

However, in each of the above conventional approaches, there is no solution by which an intelligent installation may be performed for all kinds of components or products based on zero historical knowledge directed specifically to the client system based on a knowledge database enriched by a dynamic collection model built into multiple platforms to collect real installation user experiences of a related product.

SUMMARY

The exemplary embodiments disclose a method, a computer program product, and a computer system for intelligently installing a component to a client system. The method comprises performing an association analysis to generate a component association model based on historical installation information for historically installed components on one or more further client systems. The component association model includes a build success rate model indicative of at least one of the one or more further client systems having a close relationship to the client system based on a metric pair analysis of corresponding parameters in the historical installation information and installation information of the client system. The method comprises determining an installation path to install the component to the client system based on the component association model. The method comprises transmitting assistance information to the client system based on the installation path.

In a preferred embodiment, the method further comprises collecting the historical installation information from the one or more further client systems via a dynamic collection module configured to process infrastructure information, adaption information, processing information, and service information.

In a preferred embodiment, the historical installation information includes environment information, location information, software platform information, operating system platform information, server-side network connectivity information, agent network connectivity information, existing systems information, a language selection, a selection of the component, error message information, successful mode and response code information, time information, or a combination thereof.

In a preferred embodiment, the close relationship is based on a line chart of relationship scores ordered to show an inflection point according to the metric pair analysis, the inflection point and the metric pairs prior to the inflection point being indicative of the close relationship.

In a preferred embodiment, the metric pair analysis is based on a first entropy value for a first metric in the metric pair, a second entropy value for a second metric in the metric pair, and a third entropy value for the metric pair, and wherein the relationship score is based on the first, second, and third entropy values.

In a preferred embodiment, the assistance information is provided prior to a selection of the component, upon selecting the component, upon selecting the component among a plurality of selected components to be installed, upon a confirmation of the component being selected, during installation, upon occurrence of an event including an error, or a combination thereof.

In a preferred embodiment, the component is part of a cloud native environment.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
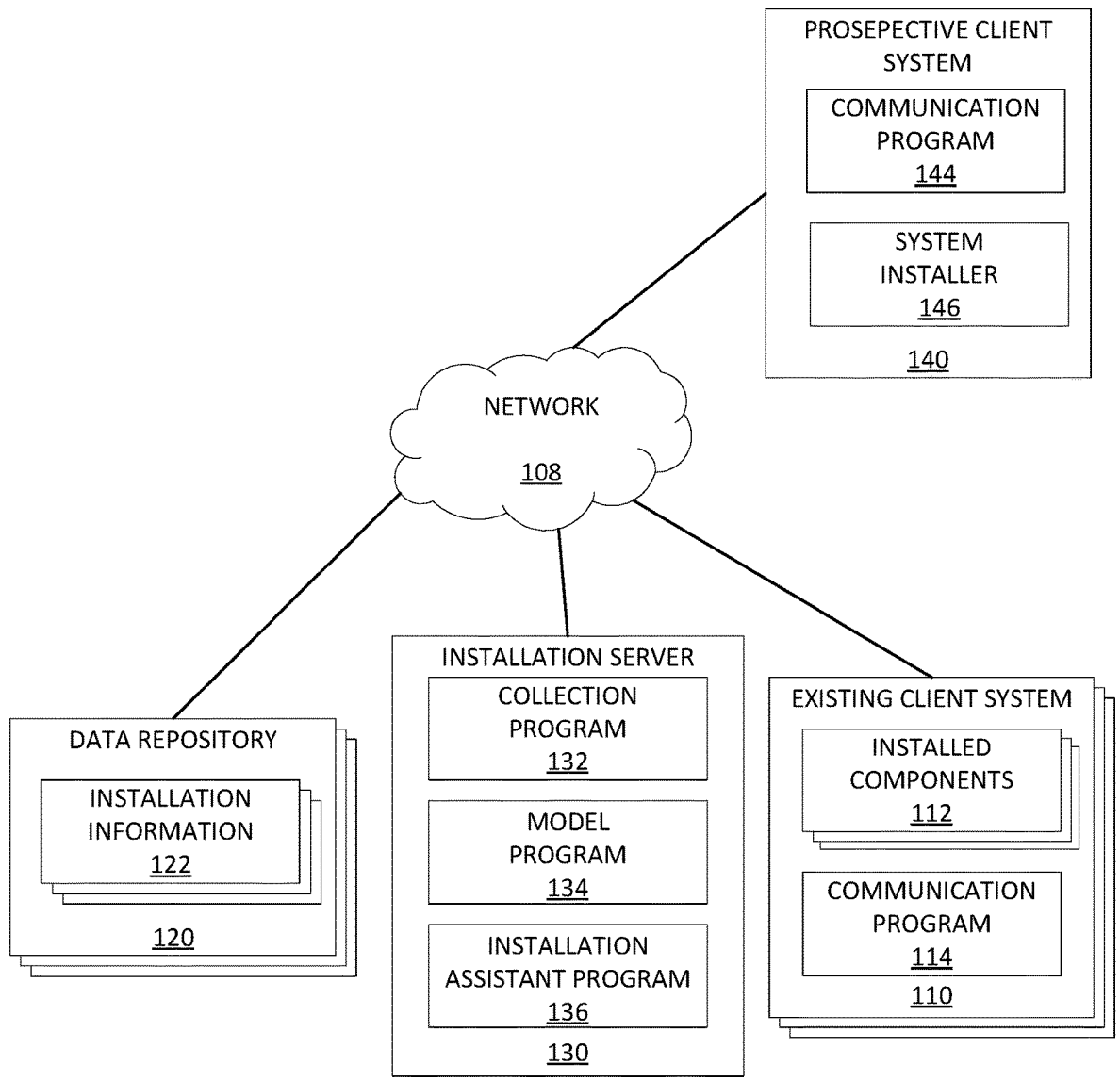
FIG. 1 depicts an exemplary schematic diagram of a component installation system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for intelligently installing a component to a client system. The exemplary embodiments is configured to collect installation information from existing client systems related to any installation environment along with results from the installation. The exemplary embodiments may provide an analysis that dynamically learns failure and success patterns between installations as well as steps thereof and the installation environment. Accordingly, the exemplary embodiments may provide a mechanism for a prospective client system to install a product based on potential success and failure patterns including best practices in avoiding and fixing a failure before an occurrence thereof. Key benefits of the exemplary embodiments may include increasing a likelihood of successfully installing a component to the client system without any need to have historical installation information that is directly correlated to the installation parameters of the prospective client system as well as handling errors that may occur. Detailed implementation of the exemplary embodiments follows.

The exemplary embodiments are described with particular regard to providing the features of the exemplary embodiments through a SaaS service based mechanism. However, the use of the SaaS service is only exemplary. The exemplary embodiments may incorporate any sharing service inside a large enterprise for installation information of existing client systems to be shared and collected for subsequent processing.

FIG. 1 depicts a component installation system 100, in accordance with the exemplary embodiments. According to the exemplary embodiments, the component installation system 100 may include one or more existing client systems 110, one or more data repositories 120, an installation server 130, and a prospective client system 140, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the component installation system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the component installation system 100 that do not utilize the network 108.

The component installation system 100 and the network 108 may also be representative of a plurality of different data exchange environments. For example, the component installation system 100 may be associated with a product provider of cloud services where each product from the product provider includes one or more components that are installed on the existing client system 110 to access the cloud services. Accordingly, the components of the component installation system 100 may be part of a cloud network and the network 108 may provide the corresponding network connections among the components of the component installation system 100 for data exchanges to be performed over the cloud along with cloud services being provided to customers (e.g., users of the existing client system 110).

In the exemplary embodiments, the existing client system 110 may include one or more installed components 112 and a communication program 114. The existing client system 110 may include one or more of any of an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. The existing client system 110 is described in greater detail as a hardware implementation with reference to FIG. 3 (e.g., data processing according to the exemplary embodiments being performed by processor 02), as part of a cloud implementation with reference to FIG. 4 (e.g., the devices in the client system according to the exemplary embodiments being represented by the laptop computer 54C), and/or as utilizing functional abstraction layers for processing with reference to FIG. 5 (e.g., workload layer 90 including installation processing 96 according to the exemplary embodiments).

The existing client system 110 may represent any client upon which the products from the product provider may be utilized by installation of one or more components as shown as the installed components 112. The existing client system 110 may also represent on-premises local systems owned and operated by the client, clusters and infrastructures rented by the client, etc. The installed components 112 may be any application that is installed to the existing client system 110 for a feature to be utilized as offered by the product provider. The existing client system 110 may have already performed one or more respective installation processes for the installed components 112. A user of the existing client system 110 (e.g., an administrator) may have a user experience in performing each of these one or more installation processes including an overall success rate, an overall failure rate, an individual success rate for the steps of the installation processes, an individual failure rate for the steps of the installation processes, an overall ease or difficulty of the installation processes, etc. A given one of the installed components 112 may have also affected one or more of the other installed components 112. In this manner, each of the existing client systems 110 may have corresponding installation information associated with the installation processes.

The existing client system 110 may utilize one or more platforms and may have one or more environments on which the installation processes were performed for the installed components 112. The platforms and the environments may also have respective parameters such as a version. The existing client system 110 may further be subject to limitations or regulations that are proprietary, enterprise, governmental, etc. In this manner, each of the existing client systems 110 may have corresponding installation information associated with parameters on which the installation processes were performed.

The existing client system 110 may additionally include other pertinent information that may be indicative of installation information. For example, a geographic location of the existing client system 110 may be of particular relevance to an installation process. In another example, network information may be of some relevance to an installation process. In this manner, each of the existing client systems 110 may have corresponding information associated with additional parameters related to the installation processes at the time they are performed.

The existing client systems 110 may encompass a wide range of types of client systems 110. For example, the existing client system 110 may be for a relatively large enterprise involving a large plurality of edge devices, central servers/devices, etc. In this manner, the installation information may be complex and varied as the devices may utilize different parameters involving environments and platforms. In another example, the existing client system 110 may be for a relatively small entity that may be as small as an individual device. In this manner, the installation information may be straightforward as the device may utilize a set of parameters involving a single environment and a single platform.

In the exemplary embodiments, the communication program 114 may act as a client in a client-server relationship and may be a software, hardware, and/or firmware based application configured to gather the installation information for a respective existing client system 110 and exchange data via the network 108. In embodiments, the communication program 114 may perform a background operation in which the installation information is gathered as well as other information such as a success or failure for a step or an installation process, and utilize various wired and/or wireless connection protocols for data transmission and exchange associated with establishing and performing a communication session, including Bluetooth, 2.4 gHz and 5 gHz internet, near-field communication, Z-Wave, Zigbee, etc.

In the exemplary embodiments, the data repository 120 may include one or more installation information 122 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the data repository 120 is shown as a single device, in other embodiments, the data repository 120 may be comprised of a cluster or plurality of electronic devices, in a modular manner, etc., working together or working independently. While the data repository 120 is also shown as a separate component, in other embodiments, the data repository 120 may be incorporated with one or more of the other components of the component installation system 100. For example, the data repository 120 may be incorporated in the installation server 130. Thus, access to the data repository 120 by components of the installation server 130 may be performed locally. The data repository 120 is described in greater detail as a hardware implementation with reference to FIG. 3, as part of a cloud implementation with reference to FIG. 4, and/or as utilizing functional abstraction layers for processing with reference to FIG. 5. In the exemplary embodiments, the installation information 122 may include the installation information as received from the existing client systems 110 via the communication program 114.

In the exemplary embodiments, the installation server 130 may include a collecting program 132, a model program 134, and an installation assistant program 136, and act as a server in a client-server relationship with the communication program 114 of the existing client system 110 as well as be in a communicative relationship with the data repository 120. The installation server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the installation server 130 is shown as a single device, in other embodiments, the installation server 130 may be comprised of a cluster or plurality of computing devices, working together or working independently. The installation server 130 is described in greater detail as a hardware implementation with reference to FIG. 3 (e.g., data processing according to the exemplary embodiments being performed by processor 02), as part of a cloud implementation with reference to FIG. 4 (e.g., the installation server 130 according to the exemplary embodiments being represented by the desktop computer 54B), and/or as utilizing functional abstraction layers for processing with reference to FIG. 5 (e.g., workload layer 90 including installation processing 96 according to the exemplary embodiments).

In the exemplary embodiments, the collecting program 132 may be a software, hardware, and/or firmware application configured to receive installation information from the existing client systems 110 and the prospective client system 140. The collecting program 132 may utilize a dynamic collection model to gather various infrastructure and installation information for the client systems including the types of installation information described above. The collecting program 132 may further gather an installation experience including environment settings, installation settings, installation status for each stage or step as well as overall (e.g., success status, failure status, errors, etc.), etc. and store this data in the data repository 120.

In the exemplary embodiments, the model program 134 may be a software, hardware, and/or firmware application configured to process the installation information from the existing client systems 110 to build a component association model. The model program 134 may analyze the trace and log information between components to detect a dependency relationship of the installed components 112 in the existing client systems 110. The component association model may be built to perform a plurality of operations. For example, the component association model may generate a potential failed ratio for every installation stage and step under a given pair of environment setting and installation setting. In another example, the component association model may determine closer relationships by analyzing the relationship scores for every point and its descending score with others. In a further example, the component association model may generate a successful path for multiple component installations by building a success rate model. The model program 134 may utilize various techniques to generate its models such as artificial intelligence, machine learning, etc. and may further incorporate various types of mechanisms such as neural networks (e.g., RNN, CNN, etc.). According to an exemplary implementation, the model program 134 may be a SaaS based online analyzer that processes the collected installation information.

In the exemplary embodiments, the installation assistant program 136 may be a software, hardware, and/or firmware application configured to provide recommendations and/or instructions to the prospective client system 140 to install one or more components for a requested product. The installation assistant program 136 may perform a plurality of operations at a variety of times in the installation process. For example, prior to the installation process, the installation assistant program 136 may generate a recommended installation path with a successful ratio based on information received from the model program 134. In another example, during the installation process, the installation assistant program 136 may adjust the installation experience and path to respond to updated installation information (e.g., user inputs, dynamic installation environment, etc.) while the installation process progresses. In a further example, after the installation process is completed, the installation assistant program 136 may generate an installation footprint and provide this installation information for this particular installation process to be added to the knowledge base of the model program 134.

In the exemplary embodiments, the prospective client system 140 may include a communication program 144 and a system installer 146. The prospective client system 140 may include one or more of any of an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. The prospective client system 140 is described in greater detail as a hardware implementation with reference to FIG. 3 (e.g., data processing according to the exemplary embodiments being performed by processor 02), as part of a cloud implementation with reference to FIG. 4 (e.g., the devices in the client system according to the exemplary embodiments being represented by the laptop computer 54C), and/or as utilizing functional abstraction layers for processing with reference to FIG. 5 (e.g., workload layer 90 including installation processing 96 according to the exemplary embodiments).

The prospective client system 140 may be substantially similar to the existing client systems 110. For example, the prospective client system 140 may also have installation information including a platform, an environment, etc. and parameters in addition to other installation information. The prospective client system 140 may also include one or more installed components similar to the existing client systems 110. However, the prospective client system 140 may currently be requesting a product from the product provider that is to be utilized thereby via one or more components being installed. Accordingly, the prospective client system 140 may utilize the features of the exemplary embodiments based on results from the installation server 130.

In the exemplary embodiments, the communication program 144 may act as a client in a client-server relationship with the installation server 130 and may be a software, hardware, and/or firmware based application configured to gather the installation information for the prospective client system 140 and exchange data via the network 108. In embodiments, the communication program 144 may perform a background operation in which the installation information is gathered as well as other information such as a success or failure for a step or an installation process prior to, during, or afterward, and utilize various wired and/or wireless connection protocols for data transmission and exchange associated with establishing and performing a communication session, including Bluetooth, 2.4 gHz and 5 gHz internet, near-field communication, Z-Wave, Zigbee, etc.

In the exemplary embodiments, the system installer 146 may act as a client in a client-server relationship with the installation server 130 and may be a software, hardware, and/or firmware based application configured to receive recommendations or instructions in which to install one or more components for a requested product from the product provider and exchange data via the network 108. In embodiments, the communication program 114 may receive the recommendations or instructions and receive inputs from a user for the one or more components to be installed, and utilize various wired and/or wireless connection protocols for data transmission and exchange associated with establishing and performing a communication session, including Bluetooth, 2.4 gHz and 5 gHz internet, near-field communication, Z-Wave, Zigbee, etc.

Figure 2:
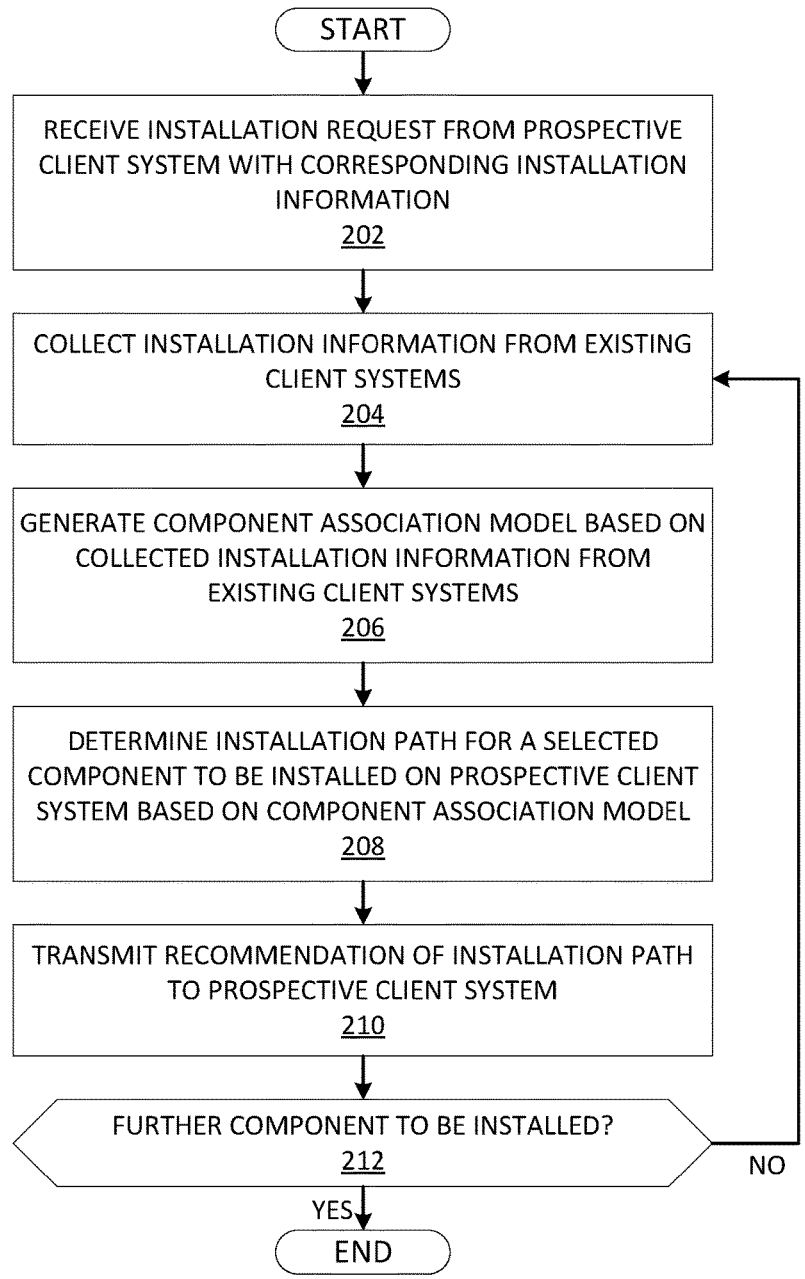
FIG. 2 depicts an exemplary flowchart of a method 200 illustrating the operations of an installation server 130 of the component installation system 100 in intelligently installing a component to a prospective client system 140, in accordance with the exemplary embodiments.

FIG. 2 depicts an exemplary flowchart of a method 200 illustrating the operations of the installation server 130 of the component installation system 100 in intelligently installing a component to the prospective client system 140, in accordance with the exemplary embodiments. The method 200 may relate to operations that are performed by the collection program 132, the model program 134, and the installation assistant program 136 of the installation server 130. The method 200 will be described from the perspective of the installation server 130.

The installation server 130 may receive an installation request from the prospective client system 140 with corresponding installation information of the prospective client system 140 (step 202). The prospective client system 140 may be associated with a client of the product provider. As such, the prospective client system 140 may request a particular product or service for which one or more components are required to be installed on the prospective client system 140 (e.g., via the communication program 144). In submitting the installation request, the prospective client system 140 may additionally provide installation information such as an environment, a version thereof, a platform, a version thereof, etc. as well as other indirect parameters that may affect the installation process of the one or more components related to the requested product (e.g., via the communication program 144). As described above, the installation information may include a plurality of different types where more installation information that is provided may be used to perform a more comprehensive analysis that may result in an installation path with greater accuracy for success and error handling.

The installation server 130 may also collect installation information from the existing client systems 110 (step 204). In a manner substantially similar to the prospective client system 140, the existing client systems 110 may also provide respective installation information to the installation server 130 (e.g., via the communication program 114). The existing client systems 110 may also include additional information in the installation information that is provided. For example, the existing client systems 110 may also include the installed components 112 that are respectively installed on the existing client systems 110. In another example, the existing client systems 110 may further include an installation footprint or log for the overall process as well as for each stage/step in installing the one or more components corresponding to the installed components 112. The installation server 130 may correlate the installation footprint/log with the other installation information (e.g., platform, environment, etc.) for a given one of the existing client systems 110 in installing the respective installed components 112.

In an exemplary implementation, the installation server 130 may collect the installation information from the existing client systems 110 and the prospective client system 140 using a dynamic data collecting process through a platform built-in dynamic collection module. The data collection module may be deployed in a variety of manners. For example, the installation server 130 may deploy the dynamic collection module via YAML where an extension to a K8S API server may be made to parse a YAML file and determine system information of the client system. In another example, the installation server 130 may deploy the dynamic collection module via an operator who makes an extension to an operator hub to watch a K8S CR and determine system information of the client system. In a further example, the installation server 130 may deploy the dynamic collection module via a helm chart where an extension to a tiller service is made to analyze a helm chart template and determine system information of the client system.

According to the exemplary implementation, the platform built-in dynamic collection module may be constructed with an architecture comprising a plurality of layers to process corresponding types of information. For example, the dynamic collection module may include an infrastructure layer configured to manage an infrastructure and system environments to process infrastructure information. In another example, the dynamic collection module may include an adaption layer configured with detectors and adaptors to access diverse environments to process adaption information. In a further example, the dynamic collection module may include a processing layer configured to process and translate data and provide assistant actions to process processing information. In yet another example, the dynamic collection module may include a service layer configured with an online analysis capability based on historic and real-time data to process service information.

According to the exemplary implementation, the dynamic data collection process may collect certain types of the installation information at different stages. For example, the dynamic data collection process may collect installation information at an initiate phase (e.g., a preparatory time frame before any part of the installation process is performed), a configuration phase (e.g., a preliminary time frame to prepare the prospective client system 140 for the installation process), an installation phase (e.g., an installation time frame when the prospective client system 140 is installing the component), and a completed phase (e.g., a post time frame after the installation process has been completed). During the initiate phase, the dynamic data collection process may collect installation information related to environment information, location information, software platform information, operating system platform information, server-side network connectivity information, agent network connectivity information, existing systems information, etc. During the configuration phase, the dynamic data collection process may collect installation information related to a language selection, selected components to be installed and an order thereof, etc. During the installation phase, the dynamic data collection process may collect installation information related to error messages, successful modes, response codes, etc. During the completed phase, the dynamic data collection process may collect installation information related to time spent for an installation of each component.

The dynamic data collection process may detect component dependencies that may affect the manner in which the installation process is performed for the component. For example, the dynamic data collection process may detect component dependencies based on an environment detector component using traces or analyses of installation logs. In another example, the dynamic data collection process may detect component dependencies based on document analysis on historical installation experiences through machine learning.

The installation server 130 may generate a component association model based on the collected installation information from the existing client systems 110 (step 206). The installation server 130 may perform an online analysis process using the model program 134 (e.g., via the SaaS). In generating the component association model, the installation server 130 may collect the installation information for a specific installation process related to the installation request from the prospective client system 140. The installation server 130 may be configured to determine a status of the installation information as to whether relevant information is available or not available where a determination of the relevance is described in further detail below. As a result of the installation information being unavailable, the installation server 130 may ignore or omit subsequent operations as the installation server 130 has a low probability of determining a result with any significant accuracy. The installation server 130 may collect numericalization data where each record includes steps, success information, and all related properties or parameters. The installation server 130 may eliminate and unit high associated items using an association analysis. The installation server 130 may build the component association model that may include a build success rate model for each step through classification with a gradient descent to minimize error.

The installation server 130 may perform an association analysis that measures a similarity of the historical installation information of the installed components 112 in the existing client systems 110 to the installation information in the prospective client system 140. In performing the association analysis, the installation server 130 may review installation properties and installation options. Using this information, the installation server 130 may split and build metric pairs and analyze a relationship score of the metric pairs. The installation server 130 may determine relationship analyzer scores for each metric pair. The installation server 130 may take a metric pair including metrics X1 and X2 and determine entropy values H(X1) and H(X2) for the metrics X1 and X2, respectively, as well as an entropy value H(X1, X2) for the metric pair. The entropy values may then be used to determine a relationship score S. The entropy values and relationship score may be determined with the following calculations.

$$H(X1) = \sum_{i=1}^{N} P(X1_i) * \log\left(\frac{1}{P(X1_i)}\right)$$

$$H(X2) = \sum_{i=1}^{N} P(X2_i) * \log\left(\frac{1}{P(X2_i)}\right)$$

$$H(X1, X2) = \sum_{i=1}^{N} P(X1_i) * \log\left(\frac{1}{P(X2_i)}\right)$$

$$S = H(X1) + H(X2) - H(X1, X2)$$

The installation server 130 may subsequently determine a close relationship of the installation information of the existing client systems 110 and the prospective client system 140. In an exemplary embodiment, the installation server 130 may draw a line chart of relationship scores S based on the entropy values that is sorted in descending order by relationship score to show an inflection point Xk. The installation server 130 may identify the inflection point Xk for a given relationship score in the line chart and metrics before the inflection point that are considered as close to the inflection point Xk where "close" is indicative of a close relationship between the existing client system 110 and the prospective client system 140 (e.g., the installation information of the existing client system 110 matching the installation information of the prospective client system 140 to transpose installation stages/steps to the prospective client system 140). The installation server 130 may generate metric closures based on the results of the line chart analysis. Using the metric closures, the installation server 130 may build a success rate model that emphasizes the correlations in the installation information of the existing client systems 110 and the prospective client system 140. For example, the installation server 130 may utilize a classification engine with a gradient descent optimization.

The installation server 130 may determine an installation path for a selected component to be installed on the prospective client system 140 based on the results from the component association model (step 208). The installation server 130 may identify one or more of the existing client systems 110 that may be an acceptable basis upon which to determine the installation path based on the above analysis (e.g., the success rate based on the compatible metrics may be at least an acceptable threshold value). The installation server 130 may utilize the installation footprint or log that the identified existing client system 110 utilized to successfully install the installed component 112 that corresponds to a component associated with the installation request from the prospective client system 140. In this manner, the installation server 130 may determine the installation path including the preparations (e.g., prior to installation) and the stages/steps to be performed for the installation (e.g., during the installation).

The installation server 130 may provide installation assistance via the installation assistant program 136. Prior to the installation, the installation server 130 may provide instructions or recommendations to prepare the prospective client system 140 for the installation process. In an exemplary implementation, the prospective client system 140 may utilize a K8S/OCP command line tool or helm command line that introduces an additional command line message. The prospective client system 140 may alternatively use an operator hub where GUI messages may be provided.

According to an illustrative embodiment, the installation server 130 may provide prompts at various stages prior to installation. For example, before installation choices or options are selected, the installation server 130 may perform the above described analysis for the prospective client system 140 based on the installed components 112 of the existing client systems 110. There may be an assumption that there is installation information that is relevant to the prospective client system 140 such that the installation server 130 does not omit or ignore the subsequent operations. At this stage, the installation server 130 may provide a prompt indicating an overall installation status with various information such as an average predicted completion time based on detected installation information of the prospective client system 140, a predicted success rate, etc. As a result of selecting installation components, the installation server 130 may provide further prompts such as an installation status for the selection and detected current environment of the prospective client system 140. The installation server 130 may further improve a success rate based on the installation information of the installed components 112 of the existing client systems 110. For example, the installation server 130 may have determined that a complete installation of a product may be affected by installation of a selected component. The installation server 130 may provide a prompt to verify whether the user of the prospective client system 140 wishes to continue with installing the selected component as well as providing information that affects the current installation process (e.g., "Do you really want a complete installation? If the selected component is added, the failure rate to install the product increases to 50% based on the detected parameters of your system and increases the installation time by at least 1 hour, especially if you are using an on-premises environment with an air-gap where your network is unstable and slow."). As a result of confirming the components that are selected to be installed on the prospective client system 140, the installation server 130 may provide an optimal installation order to better install the selected components (e.g., assuming a plurality of components are selected). The installation server 130 may also provide best practices to install the selected components (e.g., monitor progress, cancel if event X occurs, etc.). In this manner, the installation server 130 may transmit assistance information, a recommendation, or instructions based on the installation path to the prospective client system 140 (step 210).

The installation server 130 may determine whether a further component or product is to be installed on the prospective client system 140 (decision 212). As a result of at least one further component or product to be installed (decision 212, "YES" branch), the installation server 130 may perform an iteration of the above process with particular regard to the selected component or product to be installed. As a result of no further component or product to be installed (decision 212, "NO" branch), the installation server 130 may perform post installation operations (e.g., collecting an installation footprint or log of the installation process to update the knowledge base).

The installation server 130 may perform the method 200 in a modified approach to incorporate further operations and/or considerations. For example, as noted above, the installation server 130 may perform a verification operation to verify whether the installation server 130 may provide installation assistance for the prospective client system 140. In a particular scenario, the installation server 130 may only be equipped with a relatively small knowledge base of the existing client systems 110 or may have recently been implemented and have only user entered installation information or baseline information. In such a scenario, the installation server 130 may determine that there is no available comparable existing client system 110 that provides sufficiently acceptable installation information corresponding to the installation information of the prospective client system 140. As such, the installation server 130 may proceed with default assistance and utilize the installation footprint or log of this installation process to add to the knowledge base for subsequent installation processes.

In another example, the installation server 130 may include a monitoring operation during installation of the selected components to dynamically provide recommendations or instructions based on updated installation information. During the installation process, the installation server 130 may provide prompts or messages not only based on the knowledge database in the SaaS system but also support online analysis of user inputs with existing success and failure patterns provided by the model program 134. For example, after the installation process has started where a component has begun installing on the prospective client system 140, the installation server 130 may monitor inputs that are entered for the installation of the component, paying particular attention to inputs using a different format from a user's language style. The installation server 130 may also monitor for events that occur during the installation process, in particular error codes or error messages that arise on the prospective client system 140 is executing the system installer 146. For example, as a result of receiving an error message, the installation server 130 may process the error message and perform substantially similar operations in determining the installation path for the prospective client system 140 armed with this additional information. The installation server 130 may suggest modifications to the installation path, update the installation time and success rate in light of this error message, provide suggestions to bypass this error, etc.

The method 200 described in a responsive approach where the installation request is received and the subsequent operations are performed. However, the timing of the above described operations may be performed in a variety of manners. For example, the exemplary embodiments may perform the operations in a proactive manner so that the installation server 130 is prepared to provide the installation assistance upon receiving the installation request. In a particular scenario, when a prospective client system 140 is retained as a client to the product provider, the installation information of the prospective client system 140 may be provided to prepare models for the specific prospective client system 140 prior to any installation request. Thus, when an installation request is eventually received, the installation server 130 may be prepared with the appropriate build component association model including the build success rate model to determine the installation path with appropriate recommendations or instructions to install the one or more components for the product that is requested.

The exemplary embodiments provide a platform built-in method to collect user experiences of system installations and relations with various environments to global historical data for analysis with particular impact to install on cloud native environments. The exemplary embodiments may be utilized for products and/or components that may be relatively minor (e.g., an update or additional feature to a cloud service) or major (e.g., an entire cloud service). The exemplary embodiments provide suggestions and assistance in the installation process to aid users with better settings and handling for errors. The exemplary embodiments may provide such assistance even without directly corresponding historical installation processes having identical parameters between the historical installation process and the current installation process by utilizing historical installation information and determining sufficiently associated client systems having an acceptable threshold of the relationship to the current client system.

Figure 3:
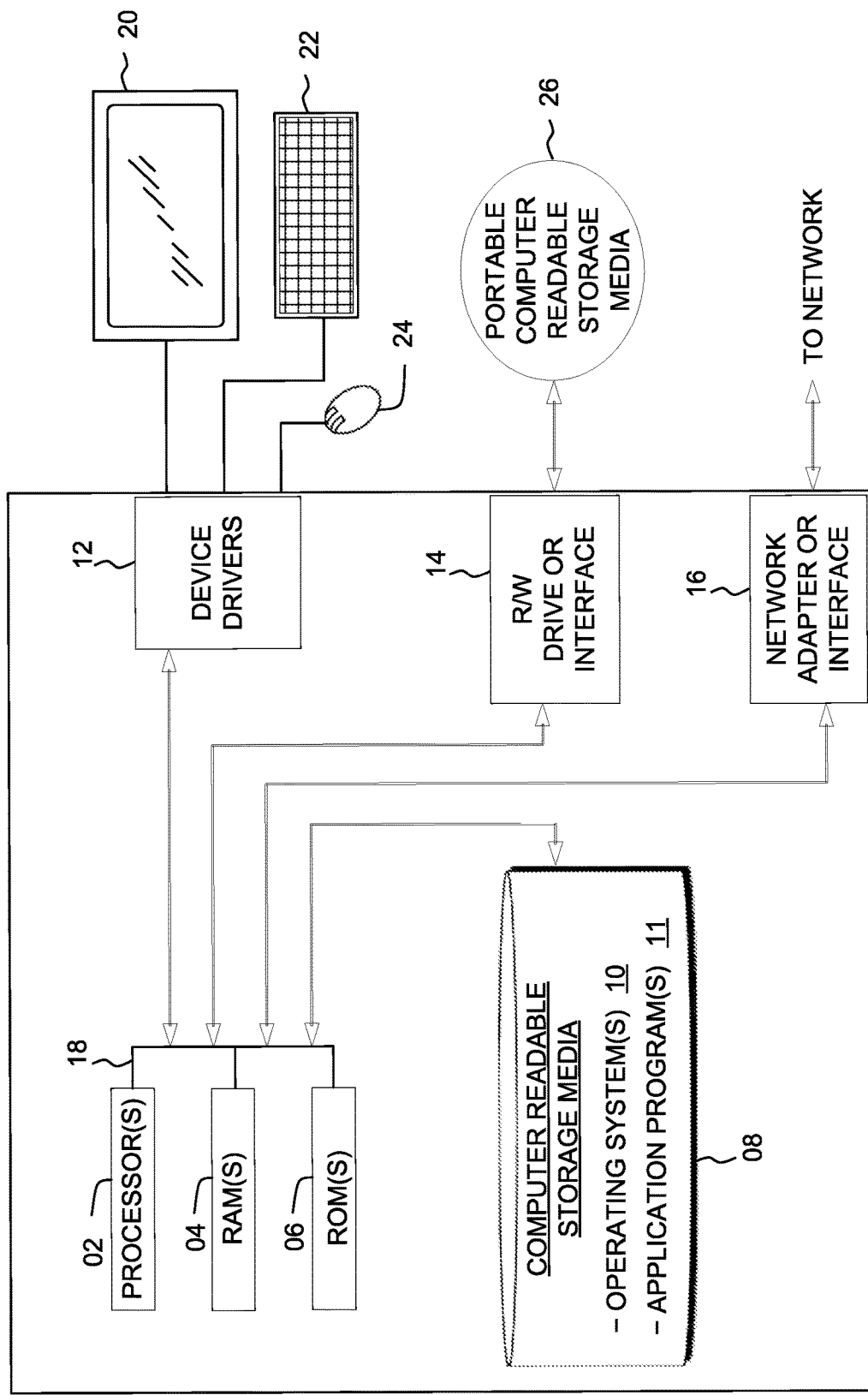
FIG. 3 depicts an exemplary block diagram depicting the hardware components of the component installation system 100 of FIG. 1, in accordance with the exemplary embodiments.

FIG. 3 depicts a block diagram of devices within the component installation system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
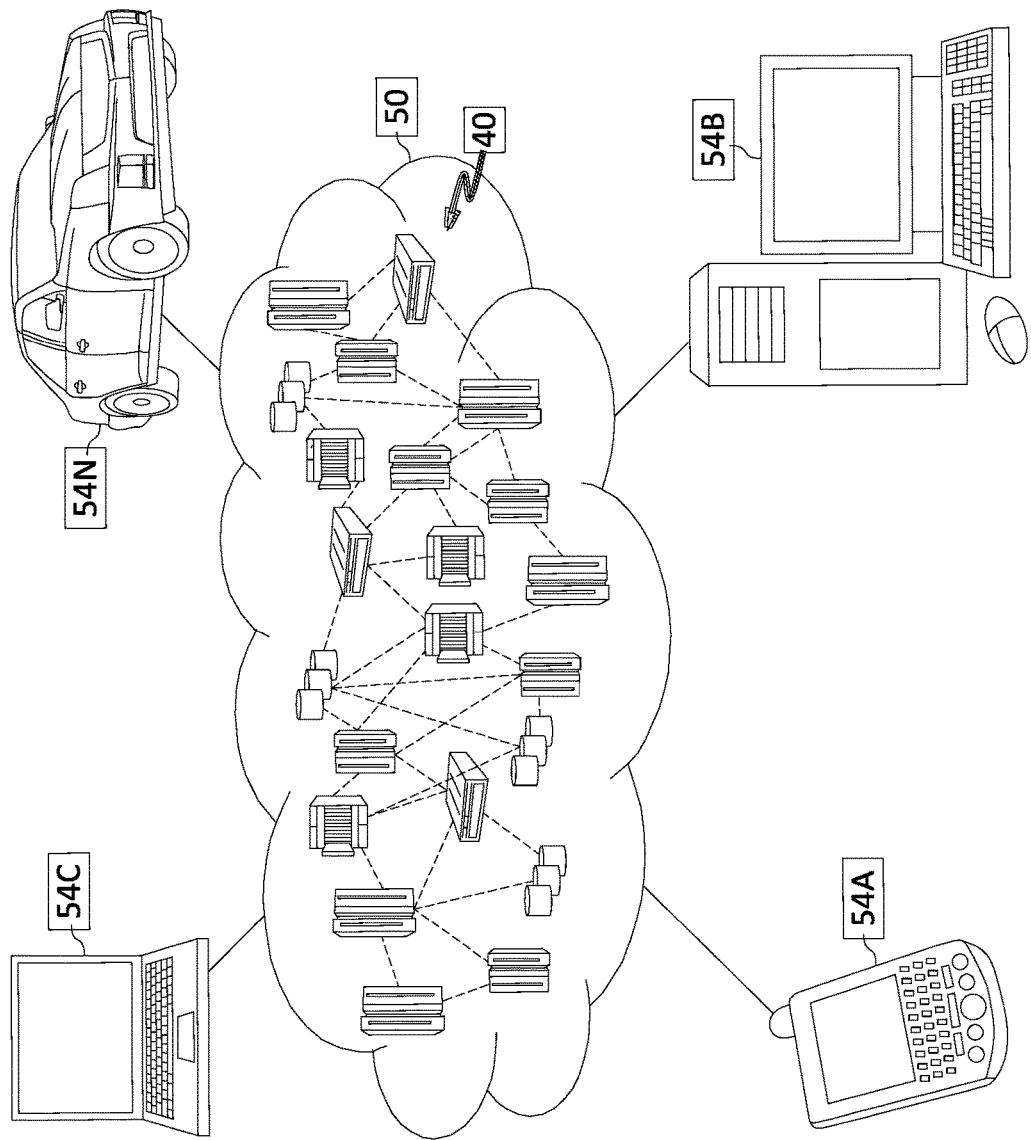
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
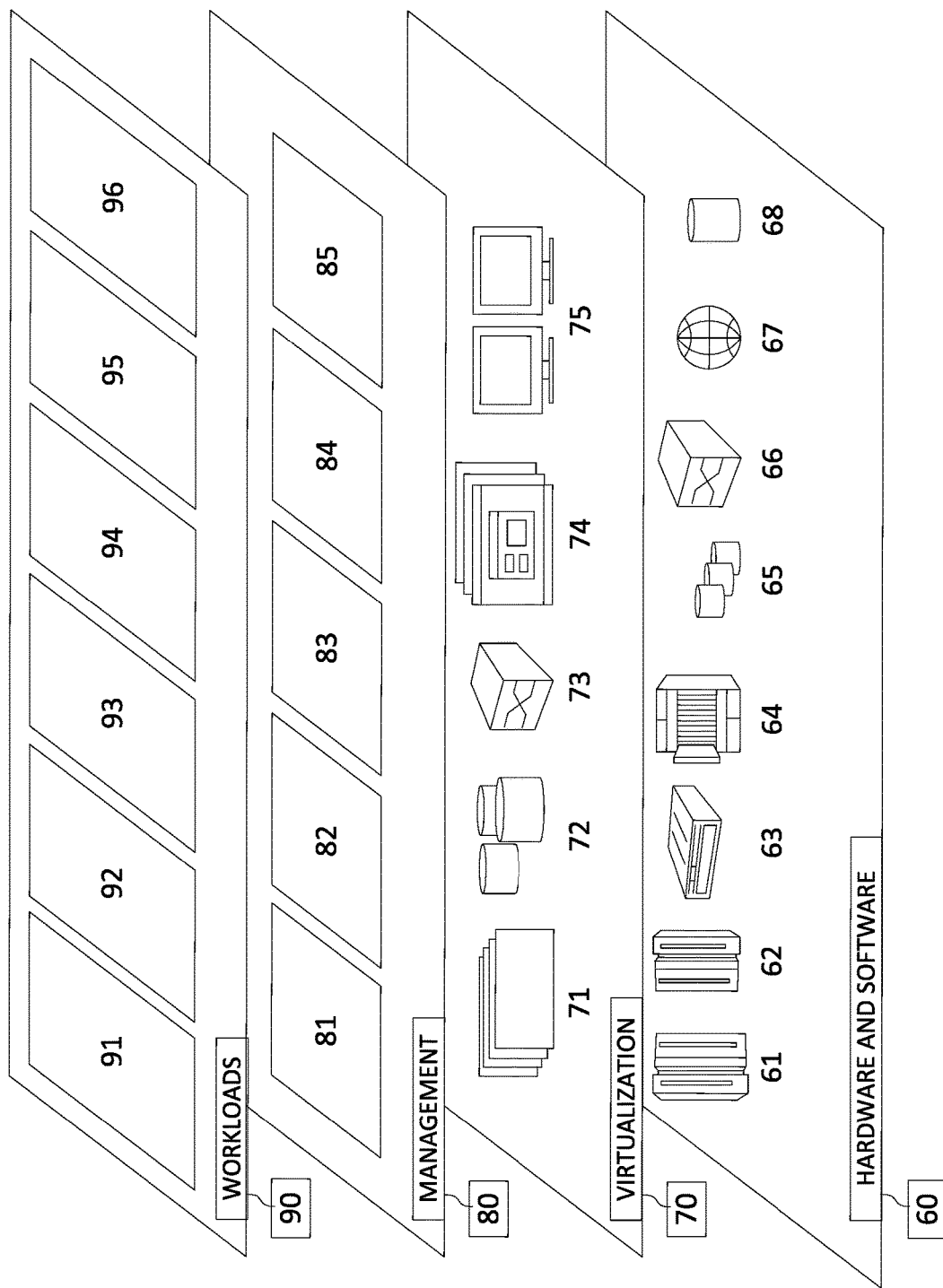
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and installation processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for intelligently installing a component to a client system, the method comprising:
   performing an association analysis to generate a component association model based on historical installation information for historically installed components on one or more further client systems, the component association model including a build success rate model indicative of at least one of the one or more further client systems having a close relationship to the client system based on a metric pair analysis of corresponding parameters in the historical installation information and installation information of the client system;
   determining an installation path to install the component to the client system based on the component association model; and
   transmitting assistance information to the client system based on the installation path.

2. The computer-implemented method of claim 1, further comprising:
collecting the historical installation information from the one or more further client systems via a dynamic collection module configured to process infrastructure information, adaption information, processing information, and service information.

3. The computer-implemented method of claim 2, wherein the historical installation information includes environment information, location information, software platform information, operating system platform information, server-side network connectivity information, agent network connectivity information, existing systems information, a language selection, a selection of the component, error message information, successful mode and response code information, time information, or a combination thereof.

4. The computer-implemented method of claim 1, wherein the close relationship is based on a line chart of relationship scores ordered to show an inflection point according to the metric pair analysis, the inflection point and the metric pairs prior to the inflection point being indicative of the close relationship.

5. The computer-implemented method of claim 4, wherein the metric pair analysis is based on a first entropy value for a first metric in the metric pair, a second entropy value for a second metric in the metric pair, and a third entropy value for the metric pair, and wherein the relationship score is based on the first, second, and third entropy values.

6. The computer-implemented method of claim 1, wherein the assistance information is provided prior to a selection of the component, upon selecting the component, upon selecting the component among a plurality of selected components to be installed, upon a confirmation of the component being selected, during installation, upon occurrence of an event including an error, or a combination thereof.

7. The computer-implemented method of claim 1, wherein the component is part of a cloud native environment.

8. A non-transitory computer-readable storage media that configures a computer to perform program instructions stored on the non-transitory computer-readable storage media for intelligently installing a component to a client system, the program instructions comprising:
performing an association analysis to generate a component association model based on historical installation information for historically installed components on one or more further client systems, the component association model including a build success rate model indicative of at least one of the one or more further client systems having a close relationship to the client system based on a metric pair analysis of corresponding parameters in the historical installation information and installation information of the client system;
determining an installation path to install the component to the client system based on the component association model; and
transmitting assistance information to the client system based on the installation path.

9. The computer program product of claim 8, wherein the program instructions further comprise:
collecting the historical installation information from the one or more further client systems via a dynamic collection module configured to process infrastructure information, adaption information, processing information, and service information.

10. The computer program product of claim 9, wherein the historical installation information includes environment information, location information, software platform information, operating system platform information, server-side network connectivity information, agent network connectivity information, existing systems information, a language selection, a selection of the component, error message information, successful mode and response code information, time information, or a combination thereof.

11. The computer program product of claim 8, wherein the close relationship is based on a line chart of relationship scores ordered to show an inflection point according to the metric pair analysis, the inflection point and the metric pairs prior to the inflection point being indicative of the close relationship.

12. The computer program product of claim 11, wherein the metric pair analysis is based on a first entropy value for a first metric in the metric pair, a second entropy value for a second metric in the metric pair, and a third entropy value for the metric pair, and wherein the relationship score is based on the first, second, and third entropy values.

13. The computer program product of claim 8, wherein the assistance information is provided prior to a selection of the component, upon selecting the component, upon selecting the component among a plurality of selected components to be installed, upon a confirmation of the component being selected, during installation, upon occurrence of an event including an error, or a combination thereof.

14. The computer program product of claim 8, wherein the component is part of a cloud native environment.

15. A computer system for intelligently installing a component to a client system, the computer system comprising:
one or more computer processors, one or more computer-readable storage media, and program instructions stored on the one or more of the computer-readable storage media for execution by at least one of the one or more processors capable of performing a method, the method comprising:
performing an association analysis to generate a component association model based on historical installation information for historically installed components on one or more further client systems, the component association model including a build success rate model indicative of at least one of the one or more further client systems having a close relationship to the client system based on a metric pair analysis of corresponding parameters in the historical installation information and installation information of the client system;
determining an installation path to install the component to the client system based on the component association model; and
transmitting assistance information to the client system based on the installation path.

16. The computer system of claim 15, wherein the method further comprises:
collecting the historical installation information from the one or more further client systems via a dynamic collection module configured to process infrastructure information, adaption information, processing information, and service information.

17. The computer system of claim 16, wherein the historical installation information includes environment information, location information, software platform information, operating system platform information, server-side network connectivity information, agent network connectivity information, existing systems information, a language selection, a selection of the component, error message information, successful mode and response code information, time information, or a combination thereof.

18. The computer system of claim 15, wherein the close relationship is based on a line chart of relationship scores ordered to show an inflection point according to the metric pair analysis, the inflection point and the metric pairs prior to the inflection point being indicative of the close relationship.

19. The computer system of claim 18, wherein the metric pair analysis is based on a first entropy value for a first metric in the metric pair, a second entropy value for a second metric in the metric pair, and a third entropy value for the metric pair, and wherein the relationship score is based on the first, second, and third entropy values.

20. The computer system of claim 15, wherein the assistance information is provided prior to a selection of the component, upon selecting the component, upon selecting the component among a plurality of selected components to be installed, upon a confirmation of the component being selected, during installation, upon occurrence of an event including an error, or a combination thereof.

\* \* \* \* \*